United States Patent
Tomala et al.

(10) Patent No.: US 12,120,774 B2
(45) Date of Patent: Oct. 15, 2024

(54) RADIO RESOURCE CONTROL PROCEDURES FOR MACHINE LEARNING

(71) Applicant: Nokia Technologies Oy, Espoo (FI)

(72) Inventors: Malgorzata Tomala, Wroclaw (PL); Cinzia Sartori, Pullach (DE); Tero Henttonen, Espoo (FI); Anna Pantelidou, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 389 days.

(21) Appl. No.: 17/637,228

(22) PCT Filed: Sep. 13, 2019

(86) PCT No.: PCT/IB2019/057748
§ 371 (c)(1),
(2) Date: Feb. 22, 2022

(87) PCT Pub. No.: WO2021/048600
PCT Pub. Date: Mar. 18, 2021

(65) Prior Publication Data
US 2022/0279341 A1  Sep. 1, 2022

(51) Int. Cl.
*H04W 8/24* (2009.01)
*G06N 20/00* (2019.01)
*H04W 24/10* (2009.01)

(52) U.S. Cl.
CPC .............. *H04W 8/24* (2013.01); *G06N 20/00* (2019.01); *H04W 24/10* (2013.01)

(58) Field of Classification Search
CPC ....... H04W 8/24; H04W 24/10; H04W 24/02; G06N 20/00
See application file for complete search history.

(56) References Cited

U.S. PATENT DOCUMENTS

2020/0154287 A1* 5/2020 Novlan ............. H04W 36/0069
2021/0345134 A1* 11/2021 Ottersten ............. H04W 16/22

FOREIGN PATENT DOCUMENTS

EP          3457634 A1    3/2019
WO     2019/011441 A1    1/2019
(Continued)

OTHER PUBLICATIONS

"Operator Defined Open and Intelligent Radio Access Networks", O-RAN Alliance, Retrieved on Feb. 22, 2022, Webpage available at : https://www.o-ran.org/.

(Continued)

*Primary Examiner* — Kabir A Timory
(74) *Attorney, Agent, or Firm* — Robert P. Michal, Esq.; Carter, DeLuca & Farrell LLP (57) ABSTRACT

An example method, apparatus, and computer-readable storage medium are provided for radio resource control (RRC) procedures for machine learning (ML). In an example implementation, the method may include receiving, by a user equipment (UE), machine learning (ML) configuration from a network node; collecting, by the user equipment (UE), machine learning (ML) data based at least on the machine learning (ML) configuration received from the network node, the machine learning (ML) data being collected from one or more layers of the user equipment (UE) in a coordinated manner; and transmitting, by the user equipment (UE), the collected machine learning (ML) data to the network node. In another example implementation, the method may include transmitting, by a network node, machine learning (ML) configuration to a user equipment (UE); and receiving, by the network node, machine learning (ML) data from the user equipment (UE), the machine learning (ML) data received in response to the machine (Continued)

learning (ML) configuration transmitted to the user equipment (UE).

1 Claim, 8 Drawing Sheets

(56) References Cited

FOREIGN PATENT DOCUMENTS

WO  2020/244905 A1  12/2020
WO  2021/047781 A1  3/2021

OTHER PUBLICATIONS

"Revised SID : Study on RAN-centric data collection and utilization for LTE and NR", 3GPP TSG RAN Meeting #81, RP-182105, Agenda: 9.3.13, CMCC, Sep. 10-13, 2018, 6 pages.

"Huawei releases its 'AI Strategy' and its 'Full-Stack, All-Scenario AI Portfolio'", IT Wire, Retrieved on Feb. 22, 2022, Webpage available at : https://www.itwire.com/development/84850https://www.itwire.com/development/84850https://www.itwire.com/development/84850https://www.itwire.com/development/84850-huaweihuawei.

"Huawei Ascend 910 AI chip unveiled—the greatest computing density on a single chip", My Broadband, Retrieved on Feb. 22, 2022, Webpage available at : https://mybroadband.co.za/news/technology/279227-huawei-ascend-910-ai-chip-unveiled-the-greatest-computing-density-on-a-single-chip.html.

"Alibaba forms chip subsidiary Pingtogue", EE News Analog, Retrieved on Feb. 22, 2022, Webpage available at : https://www.eenewsanalog.com/en/alibaba-forms-chip-subsidiary-pingtogue/.

"Verizon: Vendor Al Not Ready for Prime Time", Light Reading, Retrieved on Feb. 22, 2022, Webpage available at : https://www.lightreading.com/artificial-intelligence-machine-learning/verizon-vendor-ai-not-ready-for-prime-time/d/d-id/746503?_mc=RSS_LR_EDT&page_number=1.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

International Search Report and Written Opinion received for corresponding Patent Cooperation Treaty Application No. PCT/IB2019/057748, dated May 13, 2020, 11 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.6.0, Jun. 2019, pp. 1-960.

Charzinski, "Artificial Intelligence in Mobile Communication Networks", AI in Mobile Networks, 2018-2019, 50 pages.

* cited by examiner

RADIO RESOURCE CONTROL PROCEDURES FOR MACHINE LEARNING

TECHNICAL FIELD

This description relates to wireless communications, and in particular, to data collection for machine learning (ML).

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

An example method, apparatus, and computer-readable storage medium are provided for radio resource control (RRC) procedures for machine learning (ML).

In an example implementation, the method may include receiving, by a user equipment (UE), machine learning (ML) configuration from a network node; collecting, by the user equipment (UE), machine learning (ML) data based at least on the machine learning (ML) configuration received from the network node, the machine learning (ML) data being collected from one or more layers of the user equipment (UE) in a coordinated manner; and transmitting, by the user equipment (UE), the collected machine learning (ML) data to the network node.

In another example implementation, the method may include transmitting, by a network node, machine learning (ML) configuration to a user equipment (UE); and receiving, by the network node, machine learning (ML) data from the user equipment (UE), the machine learning (ML) data received in response to the machine learning (ML) configuration transmitted to the user equipment (UE).

DETAILED DESCRIPTION

Figure 1:
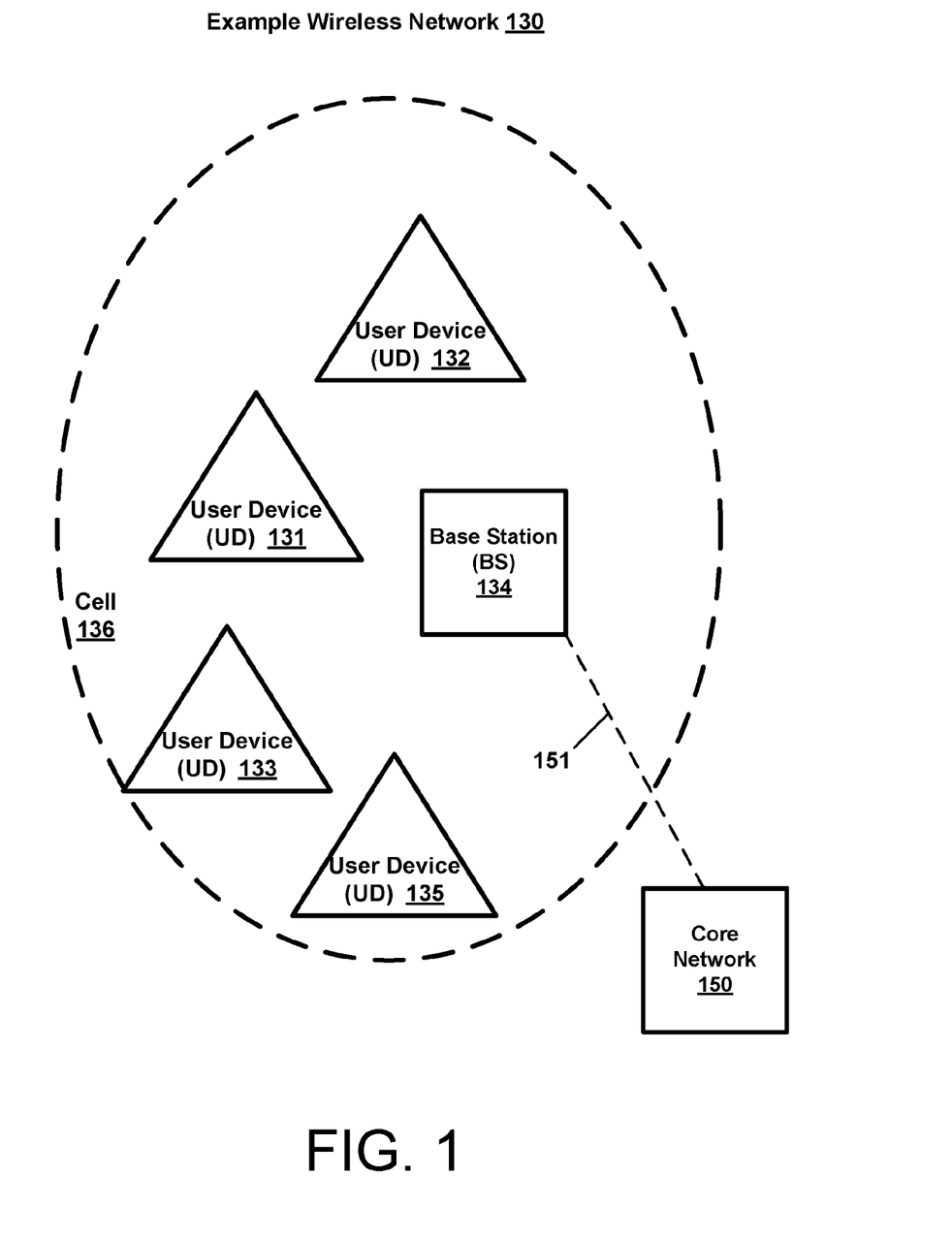
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next generation Node B (gNB), or a network node. At least part of the functionalities of an access point (AP), base station (BS), or eNB/gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples. Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

The increased complexity of 5G wireless networks may provide network operators with an unprecedented opportunity to optimize network performance in real-time (RT) or near-RT to extract the full benefits that the new(er) technologies offer. Algorithms based on ML may become a fundamental tool for network optimization and/or automation and starting to appear in standardization organizations. O-RAN Alliance is one such organization where ML models are being discussed in the context of radio access network (RAN) architecture.

O-RAN alliance has defined requirements for monitoring service level agreements (SLAs). However, the alliance has not defined how to perform their monitoring. Although, the monitoring of SLAs may be generally understood/assumed to be based on collecting performance measurement (PM) counters, the monitoring data is not collected in RT or near-RT. At the same time, ML is emerging in 3GPP with network operators setting targets for standardized collection methods that are efficient. Therefore, ML has the potential to become powerful tool by making predictions or suggestions based on large amounts of data (e.g., also referred to as Big Data) that may be collected at UEs and/or gNBs, or a combination thereof.

However, there are several problems associated with data collection for ML algorithms from the end users in the field (e.g., UEs) as the collected data has to meet certain requirements to be useful for ML. For instance, radio resource control (RRC) procedures may enable data collection (e.g., parameters, reports, etc.) by a radio access network (RAN) entity from a user equipment (UE). However, the data may come with different granularity, in different times for different purposes with different reports and procedures. That is, there is no coordination in the data collection process for the collected data to be useful for ML.

The present disclosure addresses the above described problems associated with data collection for ML algorithms such that the collected data can be used efficiently for ML. The present disclosure describes a coordinated method for collecting data at a UE for ML.

In one example implementation, the method may be initiated at a RAN network function (NF) that may have the role of a ML host (e.g., where the ML algorithm is executed) with a direct interface to a UE and may coordinate inputs from other ML hosts (e.g., the algorithm may be made of a ML pipeline, a chain of ML algorithms, etc.). The inventive step may include the RAN NF recognizing the need to collect data for ML purposes from the UE and triggering the RAN NF to query the UE to collect data in a manner and structure that can be used by the ML algorithm. The UE responds to the query by collecting and processing required data as a separate record (e.g., storage, reporting, etc.) for ML. In some implementations, the proposed method may provide: i) RAN capability to determine the need to involve users for collecting data for ML Learning; ii) new signaling specific for ML, realized either by a separate ML dedicated protocol stack or by RRC radio interface with new procedures for ML; and/or iii) UE capability to act on the signaling (determining which data needs to be delivered and provisioning of the data for ML).

In an example implementation, the disclosure describes a method that may include receiving, by a user equipment (UE), machine learning (ML) configuration from a network node; collecting, by the user equipment (UE), machine learning (ML) data based at least on the machine learning (ML) configuration received from the network node, the machine learning (ML) data being collected from one or more layers of the user equipment (UE) in a coordinated manner; and transmitting, by the user equipment (UE), the collected machine learning (ML) data to the network node.

In another example implementation, the disclosure describes as a method that include may include transmitting, by a network node, machine learning (ML) configuration to a user equipment (UE); and receiving, by the network node, machine learning (ML) data from the user equipment (UE), the machine learning (ML) data received in response to the machine learning (ML) configuration transmitted to the user equipment (UE).

Figure 2:
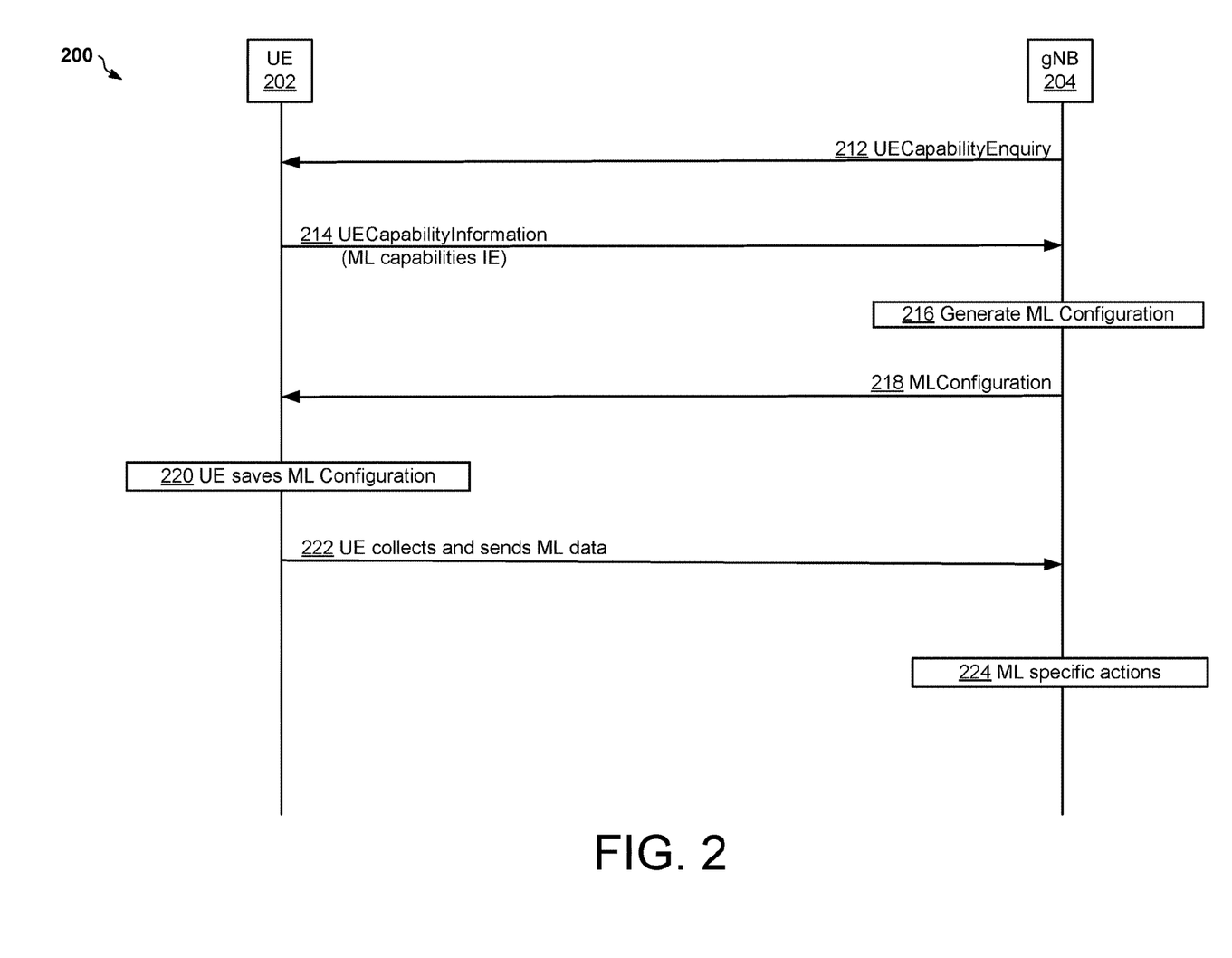
FIG. 2 is a message flow diagram illustrating procedures for machine learning (ML) at a user equipment (UE), according to an example implementation.

FIG. 2 is a message flow diagram 200 illustrating procedures for machine learning (ML) at a user equipment (UE), according to an example implementation.

In some implementations, for example, FIG. 2 illustrates a UE (e.g., UE 202) and a network node (e.g., a gNB 204). Although, only UE 202 and gNB 204 are illustrated in FIG. 2, in an example implementation, the present disclosure may be applied to a plurality of UEs located in the coverage area of gNB 204. In another example implementation, the present disclosure may be applied to a plurality of gNBs when collecting data at cluster/network level for ML. In another additional example implementation, the present disclosure may be applied to a plurality of UEs and/or a plurality of UEs for ML.

In an example implementation, ML procedures at the gNB may be triggered in response to a message received at the gNB, for example, from another network entity, e.g., core network (CN) entity, radio intelligent controller (RIC), or an Operations, Administration and Management (OAM) entity.

At 212, gNB 204 may send UECapabilityEnquiry message, an RRC message, to UE 202. The UECapabilityInformation message requests UE 202 to indicate the capabilities of the UE to the gNB. In some implementations, for example, gNB 204 may send the UECapabilityEnquiry message to UE 202 upon receiving of a trigger by the gNB.

At 214, UE 202 may transmit UECapabilityInformation message to gNB 204 in response to receiving the UECapabilityEnquiry message from the gNB at 212. The UECapabilityInformation message is an RRC message which indicates capabilities of the UE to the gNB. In some implementations, for example, the UECapabilityInformation message may include an information element (IE) indicating ML capabilities of the UE. In some implementations, for example, the UECapabilityInformation message may include an information element (IE) indicating ML capabilities of the UE in response to a selective query in the UECapabilityEnquiry message (e.g., on whether the ML capabilities are supported).

At 216, gNB 204 may generate an ML configuration for the UE. In some implementations, for example, gNB 204 may generate ML configuration for UE 202 based at least on the capabilities indicated in the UECapabilityInformation message received from the UE and/or information received in the trigger.

At 218, gNB 204 may transmit the generated ML configuration to UE 202. In some implementations, for example, the ML configuration may include a ML command which indicates the ML data to be collected at the UE. In an example implementation, the ML command may indicate to the UE to collect an error metric at one or more layers of the UE. In another example implementation, the ML command may indicate to the UE to collect packets exceeding a specific payload size at one or more layers of the UE.

In some implementations, for example, the ML configuration may be updated by the gNB by sending new ML configuration to the UE. In some more implementations, for example, ML configuration may be initially sent to the UE such that the ML configuration may be activated/deactivated by the gNB as needed. In some more implementations, for example, the ML configuration may be sent to the UE with an expiration time. That is, the ML configuration expires after a fixed amount of time (e.g., 3 hours). In some more implementations, the ML configuration may be sent to the UE with a validity duration (for example, HH1:MM1:SS1—HH2:MM2:SS2).

In some implementations, for example, the ML configuration may be sent to the UE as a separate RRC message, included as part of RRC configuration procedure or RRC data query. In a scenario where the ML configuration is sent as part of RRC configuration procedure or RRC data query, the RRC message may contain an attribute (or a parameter, a field, etc.) that may indicate the need for collecting ML data.

In one example implementation, the ML configuration may include a fixed payload, e.g., at least a bit/a flag. In another example implementation, the ML configuration may contain payload that may be changed/extended with explicit indication on what data/reports are being requested. In some implementations, for example, the parameters of the ML configuration may indicate whether the request is for RT or non-RT data. The gNB may use this information to decide how and from which UEs to request the ML data (e.g., whether raw data is required to be collected by certain UEs or some averages are required). In some implementations, this may also depend on the UE capabilities and the indicated memory reserved for ML.

In some implementation, the UECapabilityInformation IE may indicate UE capabilities related to ML and indicates the amount of memory the UE can reserve for ML. The gNB, based on the indicated UE capabilities, may determine whether the UE can be selected (or another UE should be selected for ML). This determination, in some implementations, may be based 3GPP TS 38.331. As memory and processing capabilities associated with ML may play a role, the gNB may consider memory available for ML when picking a UE for ML and may pick another UE if the other UE has better ML capabilities (e.g., higher memory and/or processing power).

At 220, UE 202 may save (e.g., store) the received ML configuration at the UE.

At 222, UE 202 may collect the ML data based at least on the saved ML configuration and send the collected ML data to gNB 204. In some implementations, for example, an ML function at the UE (referred to as UE ML Function) may coordinate the collection and/or transmission of the ML data to the gNB. Similarly, a RAN ML Function at the gNB 204 may coordinate the ML operations at the gNB.

In an example implementation, as described above, the ML command may have indicated to collect an error metric at one or more layers of the UE. As this may occur at different times at different layers, the ML function or ML at the UE (as described in detail in reference to FIGS. 3-5) may coordinate the collection of data from the different layers and report it to the gNB, once a reporting trigger is met.

The ML Functions at UE and gNB may be implemented in several ways. A few example implementations are described in detail below in reference to FIGS. 3-5. These are for illustration and explanation purposes only and should not considered or interpreted as limitations.

At 224, upon receipt of the ML data received from UE 202, in some implementations, for example, gNB 204 may perform actions based at least on the ML data received from the UE. In an example implementation, the action may include changing values of one or parameters at the UE for network optimization.

In some implementations, for example, the RRC-placed ML specific memory and procedures may require the UE to recognize and mark the data that are required for ML report. For example, if RSRP measurements that have been performed for Radio Resource Management (RRM) satisfy the condition for ML report, the RSRP measurements are included in the ML report and send using ML specific procedures. In addition, the RRC-placed ML specific memory may require cross-layer interfacing and actions to collect ML specific data from other protocol stacks (e.g., if they were ML configuration command). In some implementations, for example, the memory may be a separate entry and place (e.g., in a separate protocol stack).

Although the present disclosure describes the ML techniques using radio resource control (RRC) procedures, which may be built on the existing standard protocol stacks, it should be noted that the present disclosure is not limited to Uu protocol (air interface between UE an gNB). In some implementations, the techniques described in the present disclosure may be implemented using ML-specific signaling (or ML-specific protocol).

Thus, the proposed disclosure describes efficient procedures for collecting data for ML.

Figure 3:
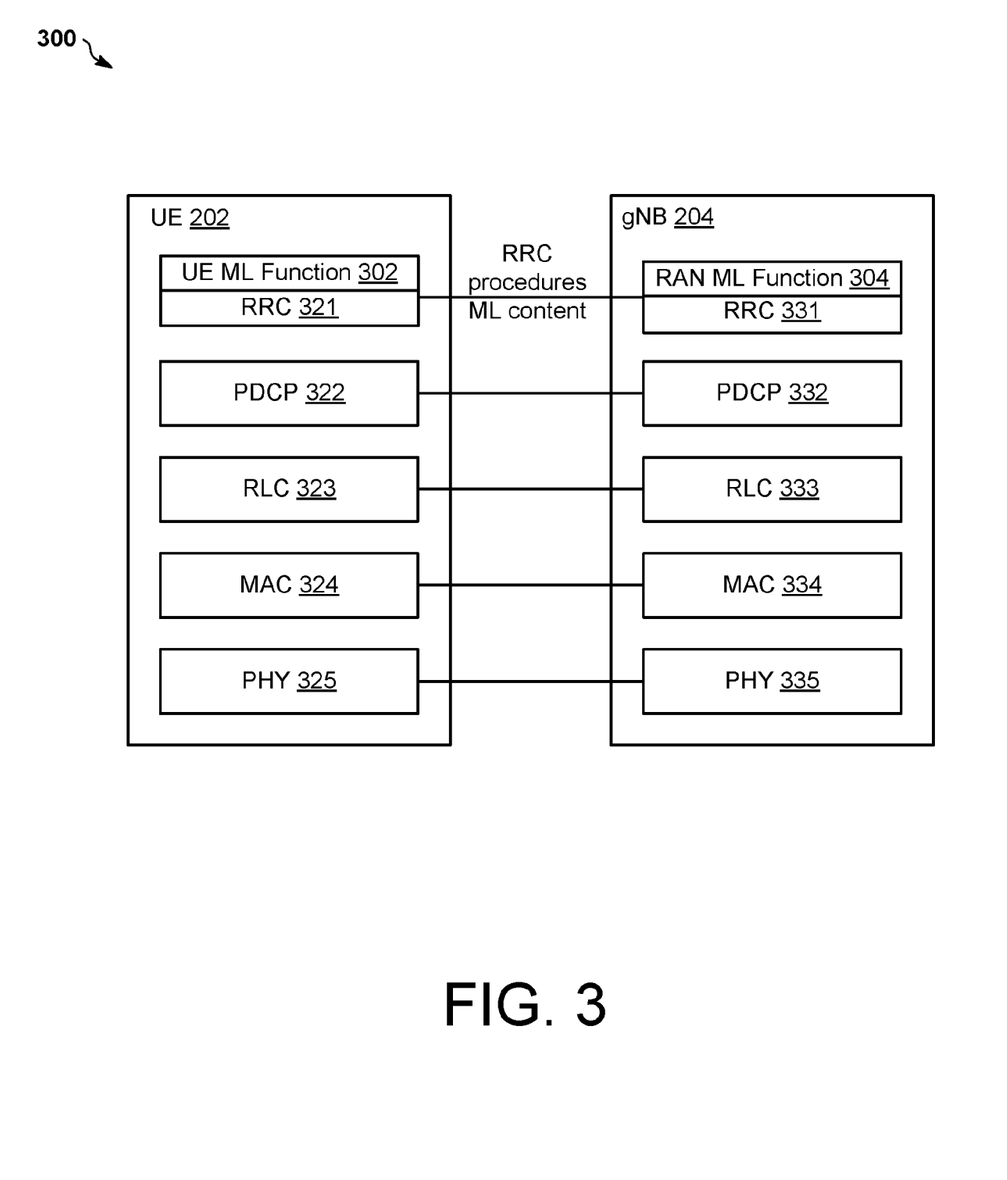
FIG. 3 is a block diagram illustrating ML functions in control plane (CP) protocol stack, according to an example implementation.

FIG. 3 is a block diagram 300 illustrating ML functions in control plane (CP) protocol stack, according to an example implementation.

In some implementations, for example, upon receiving the ML configuration from gNB 204, UE 202 may coordinate collection of ML data from one or more layers (RRC 321, PDCP 322, RLC 323, MAC 324, and/or PHY 325) at the UE. The UE coordinates ML data collection based at least on the ML command in the ML configuration. In addition, as described above, in some implementations, for example, the ML configuration may be sent to the UE as a separate RRC message, included as part of RRC configuration procedure or RRC data query.

In an example implementation, RAN ML Function 304 at RRC layer of gNB 204 may transmit the ML command via RRC signaling to UE 202. UE ML Function 302 located at the RRC layer of the UE may interface with RAN ML Function 304 to receive the ML configuration and/or ML command. In addition, UE ML Function 302 coordinates collection of ML data from one or more layers of the UE and/or transmits the collected ML data to the gNB. In some implementations, UE ML Function 302 and RAN ML Function 304 may be considered as ML entities at UE 202 and gNB 204, respectively.

Figure 4:
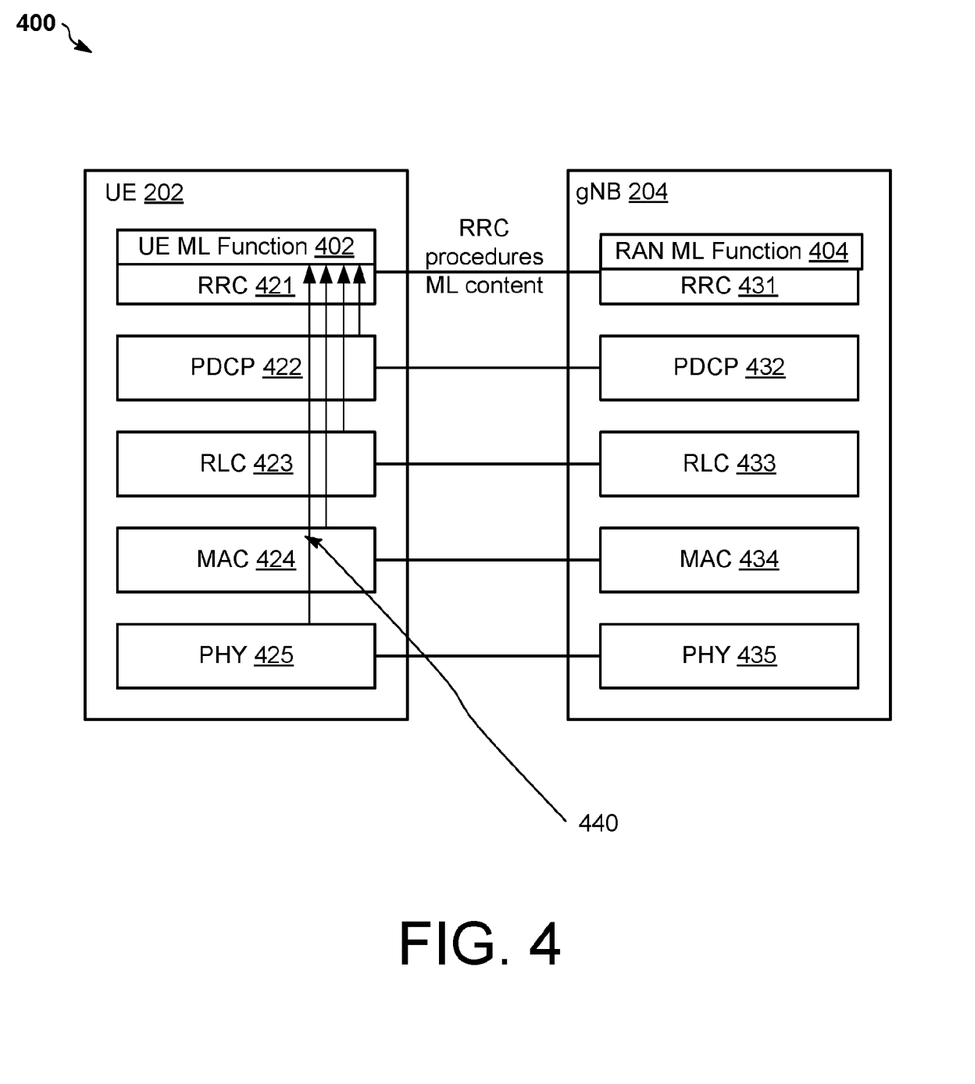
FIG. 4 is a block diagram illustrating ML functions in control plane (CP) protocol stack, according to an additional example implementation.

FIG. 4 is a block diagram 400 illustrating ML functions in control plane (CP) protocol stack, according to an additional example implementation.

In some implementations, for example, upon receiving the ML configuration from the gNB, UE 202 may coordinate collection of ML data from one or more layers (RRC 421, PDCP 422, RLC 423, MAC 424, and/or PHY 425) at the UE via direct interfaces from the RRC layer to the other layers (e.g., PDCP, RLC, MAC, etc.). The UE coordinates ML data collection based at least on the ML command in the ML configuration.

In an example implementation, RAN ML Function 404 (which be same/similar to RAN ML Function 304 of FIG. 3) at RRC layer of gNB 204 may transmit the ML command via RRC signaling to UE 202. UE ML Function 402 located at the RRC layer of the UE may interface with RAN ML Function 404 to receive the ML configuration and/or ML command. In addition, UE ML Function 402 coordinates collection of ML data from RRC 521 and/or other layers (e.g., PDCP 522, RLC 523, MAC 524, and/or PHY 525) of the UE via direct interfaces (440 of FIG. 4) to these layers and/or transmits the collected ML data to the gNB. In some implementations, UE ML Function 402 and RAN ML Function 404 may be considered as ML entities at UE 202 and gNB 204, respectively.

Figure 5:
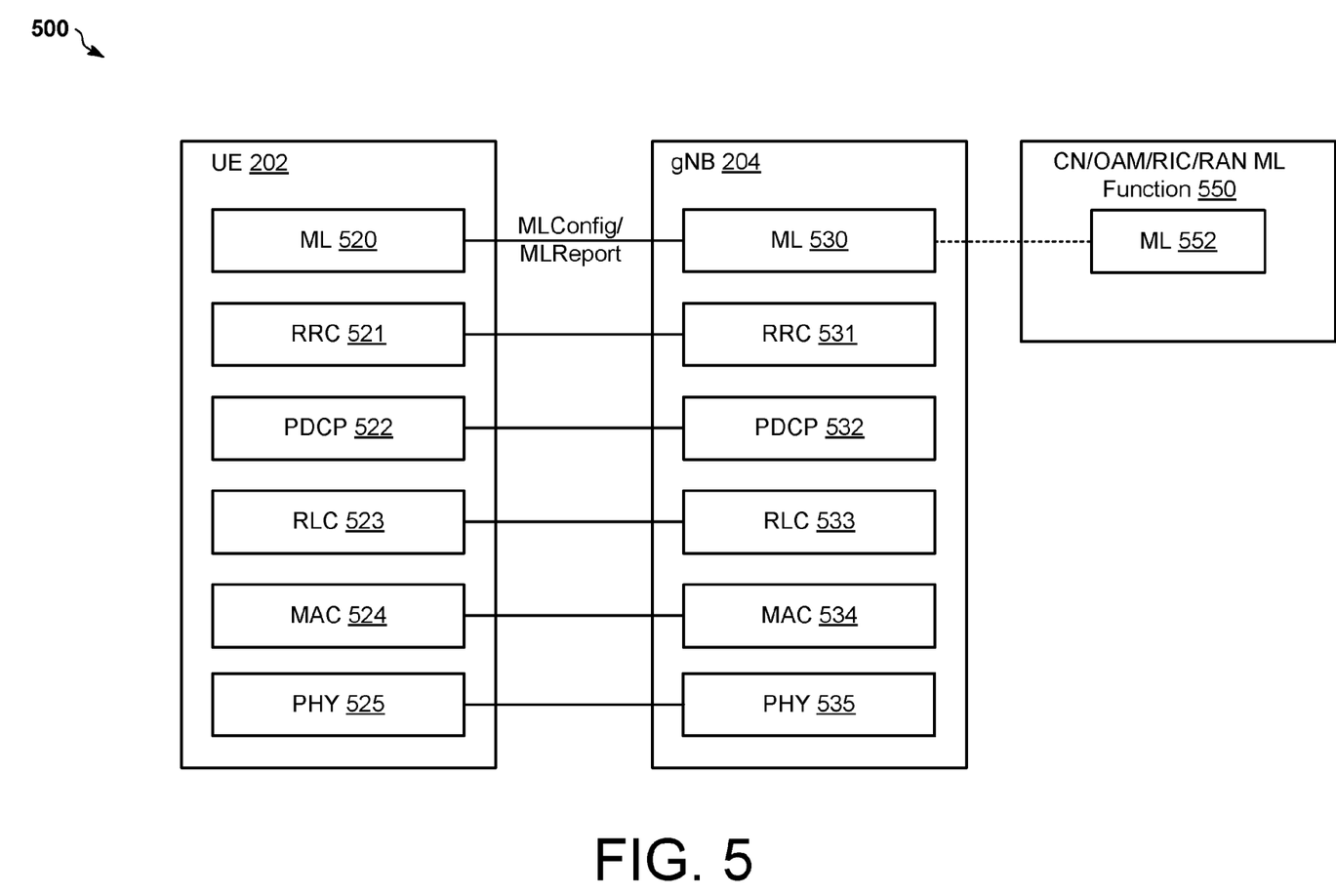
FIG. 5 is a block diagram illustrating ML control plane (CP) protocol stack, according to another additional example implementation.

FIG. 5 is a block diagram 500 illustrating ML control plane (CP) protocol stack, according to another additional example implementation.

In some implementations, the control plane protocol stack between UE 202 and gNB 202 may include an ML layer 520 at UE 202 and an ML layer 530 at gNB 202. In an example implementation, the UE may receive the ML configuration from the gNB via ML layer 520 (from ML layer 530 at the gNB). ML layer 520 may collect data from one or more layers at the UE and transmits the collected ML data to the gNB (e.g., ML layer 530). The UE coordinates ML data collection based at least on the ML command in the ML configuration. In some implementations, the trigger for ML may be triggered at a network entity ML Function 550 (e.g., CN, OAM, RIC, etc.). In some implementations, ML layer 520 and RAN ML layer 530 may be considered as ML entities at UE 202 and gNB 204, respectively.

Figure 6:
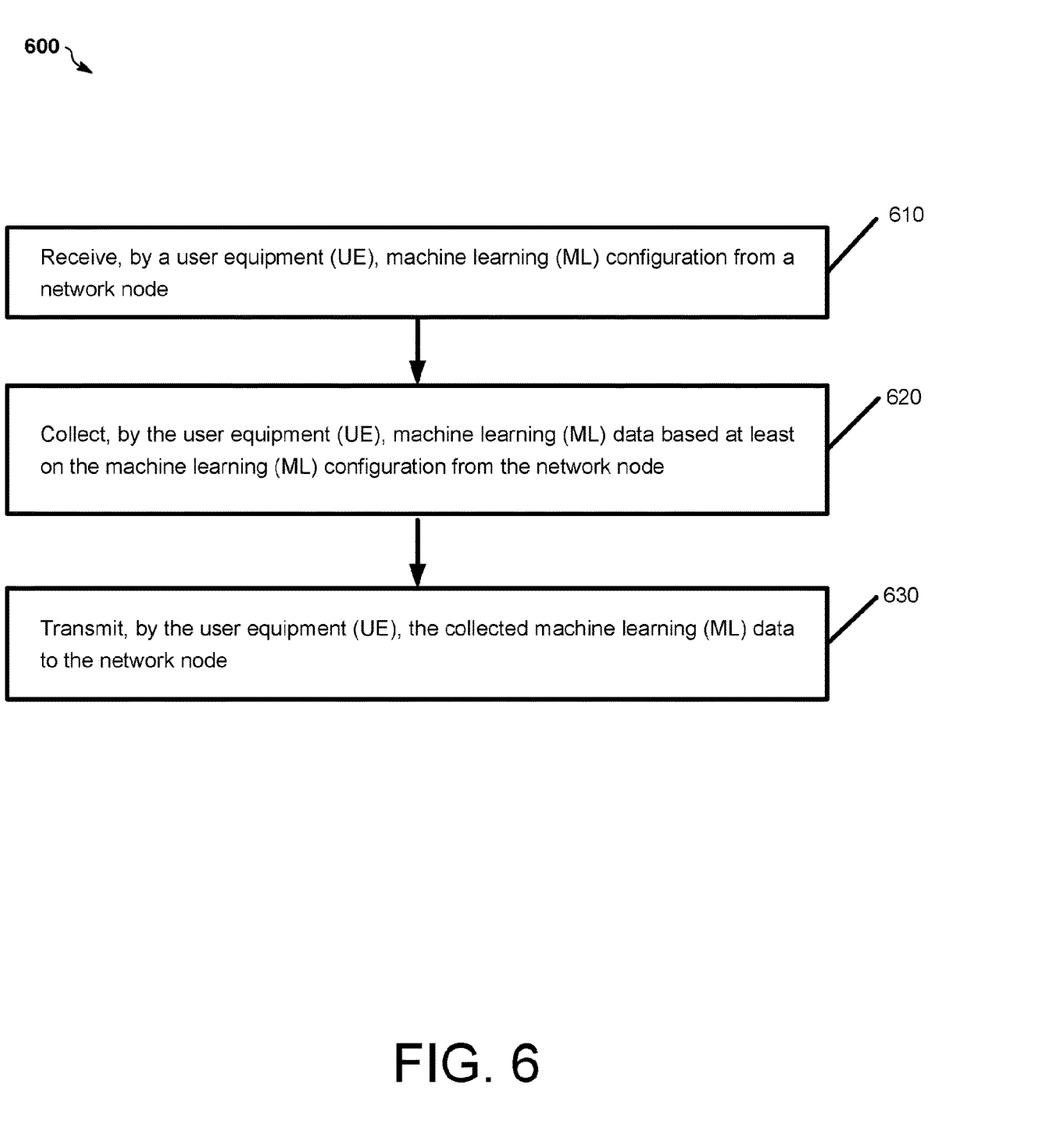
FIG. 6 is a flow chart illustrating data collection for machine learning at a user equipment (UE), according to at least one example implementation.

FIG. 6 is a flow chart 600 illustrating data collection for machine learning at a user equipment (UE), according to at least one example implementation.

At block 610, a UE (e.g., UE 202) may receive ML configuration from a network node (e.g., gNB 204). In an example implementation, UE 402 may receive configuration information from gNB 410. The configuration information, for example, may include a listing of cells the UE may use for configuring as secondary cells for DC/CA.

At block 620, the UE may collect ML data. In an example implementation, the ML data collected at UE 202 may be based at least on the ML configuration received from network node 204.

In some implementations, UE 202 may collect ML data from one or more layers at the UE. In one example implementation, UE 202 may collect ML data from RRC and PDCP layers. In another example implementation, UE 202 may collect ML data from PDCP and RLC layers. In another additional example implementation, UE 202 may collect ML data from RRC and MAC layers. It should be noted that these are just some examples and should not be considered as limitations.

At block 630, the UE may transmit the collected ML data to the network node. In an example implementation, UE 202 may transmit the ML data collected at the UE to the network node.

In some implementations, UE 202 may coordinate the collection of ML data from one or more layers at the UE and transmits the collected ML data to the network node.

Additional example implementations are described herein.

Example 1. A method of communications, comprising: receiving, by a user equipment (UE), machine learning (ML) configuration from a network node; collecting, by the user equipment (UE), machine learning (ML) data based at least on the machine learning (ML) configuration received from the network node, the machine learning (ML) data being collected from one or more layers of the user equipment (UE) in a coordinated manner; and transmitting, by the user equipment (UE), the collected machine learning (ML) data to the network node.

Example 2. The method of Example 1, further comprising: receiving, by the user equipment (UE), a UECapabilityEnquiry message from the network node; and transmitting, by the user equipment (UE), a UECapabilityInformation message to the network node, the UECapabilityInformation message is transmitted to the network node in response to the receiving of the UECapabilityEnquiry message from the network node, wherein the machine learning (ML) configuration is received from the network node based at least on machine learning (ML) capabilities of the UE indicated to the network node in the UECapabilityInformation message.

Example 3. The method of any combination of Examples 1-2, wherein the user equipment (UE) coordinates the collecting of the machine learning (ML) data at the user equipment (UE), the collecting based at least on a machine learning (ML) command in the machine learning (ML) configuration.

Example 4. The method of any combination of Examples 1-3, wherein the machine learning (ML) configuration includes a machine learning (ML) command that indicates the machine learning (ML) data to be collected in the coordinated manner at the user equipment (UE).

Example 5. The method of any combination of Examples 1-4, wherein the machine learning (ML) command is received via radio resource control (RRC) signaling.

Example 6. The method of any combination of Examples 1-5, wherein a machine learning (ML) entity at a radio resource control (RRC) layer of the user equipment (UE) collects the machine learning (ML) data generated at the radio resource control (RRC) layer of the user equipment (UE).

Example 7. The method of any combination of Examples 1-6, wherein the machine learning (ML) entity at the radio resource control (RRC) layer of the user equipment (UE) manages the transmitting of the data collected at the radio resource control (RRC) layer of the user equipment (UE) to the network node.

Example 8. The method of any combination of Examples 1-7, wherein a machine learning (ML) entity at a radio resource control (RRC) layer of the user equipment (UE) collects data generated at the radio resource control (RRC) layer of the user equipment (UE) and one or more other layers of the user equipment (UE).

Example 9. The method of any combination of Examples 1-8, wherein the one or more other layers include: a packet data convergence protocol (PDCP) layer; a radio link control (RLC) layer; a media access control (MAC) layer; and a physical (PHY) layer.

Example 10. The method of any combination of Examples 1-9, wherein the machine learning (ML) entity at the radio resource control (RRC) layer of the user equipment (UE) manages the transmitting of the data collected at the radio resource control (RRC) layer and the one or more other layers of the user equipment (UE).

Example 11. The method of any combination of Examples 1-10, wherein the machine learning (ML) command is received via machine learning (ML) layer signaling.

Example 12. The method of any combination of Examples 1-11, wherein a machine learning (ML) layer of the user equipment (UE) collects the machine learning (ML) data generated at one or more other layers of the user equipment (UE).

Example 13. The method of any combination of Examples 1-12, wherein the one or more other layers include: a radio resource control (RRC) layer; a packet data convergence protocol (PDCP) layer; a radio link control (RLC) layer; a media access control (MAC) layer; and a physical (PHY) layer.

Example 14. The method of any combination of Examples 1-13, wherein the machine learning (ML) entity at the machine learning (ML) layer of the user equipment (UE) manages the transmitting of the machine learning (ML) data collected at the machine learning (ML) layer to the network node.

Example 15. The method of any combination of Examples 1-14, wherein the network node is a gNB.

Example 16. An apparatus comprising at least one processor and at least one memory including computer instructions, when executed by the at least one processor, cause the apparatus to perform a method of any of Examples 1-15.

Example 17. An apparatus comprising means for performing a method of any of Examples 1-15.

Example 18. A non-transitory computer-readable storage medium having stored thereon computer executable program code which, when executed on a computer system, causes the computer system to perform the steps of any of Examples 1-15.

Figure 7:
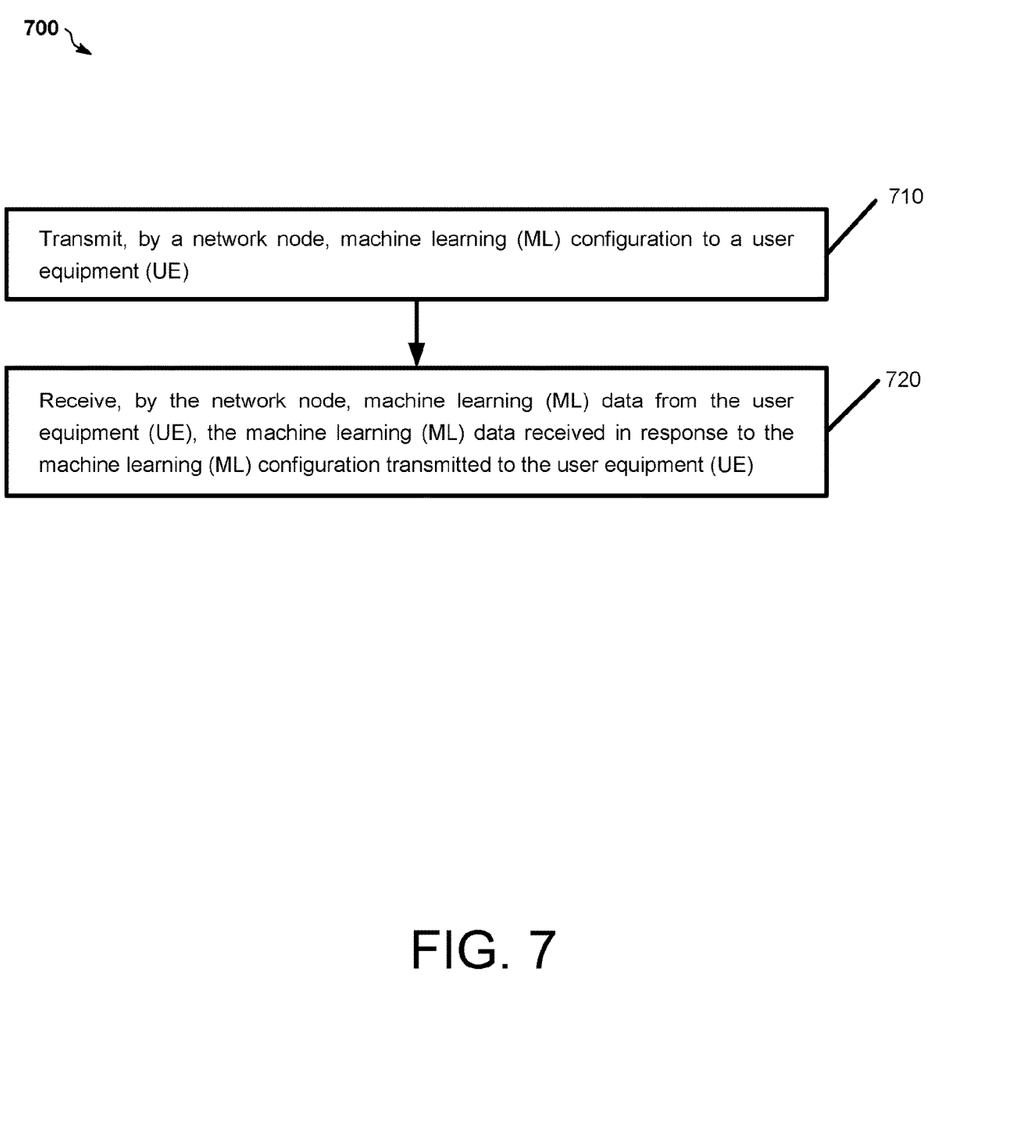
FIG. 7 is a flow chart illustrating data collection for machine learning by a network node, according to at least one example implementation.

FIG. 7 is a flow chart 700 illustrating data collection for machine learning by a network node, according to at least one example implementation.

At block 710, a network node (e.g., gNB 204) may transmit ML configuration to a user equipment (e.g., UE 202). In some implementations, for example, the ML configuration is generated by gNB 204 in response to a trigger received by the gNB. The trigger may be associated with initiating ML procedures at gNB 204 and/or UE 202.

In some implementations, for example, the ML configuration may include a ML command which may indicate to the UE the ML data to be collected at the UE for transmissions to the gNB.

At block 720, gNB 204 may receive ML data from the UE. In an example implementation, the ML data may be received by gNB 204 in response to the transmission of the ML configuration to the UE.

In some implementations, for example, the network node, upon receiving of a trigger, may transmit a UECapabilityEnquiry Message to the UE. Upon the transmission of the UECapabilityEnquiry Message to the UE, gNB 204 may receive an UECapabilityInformation message from the user equipment (UE). The UECapabilityInformation message may indicate the ML capabilities of the user equipment (UE) as different UEs may have different ML capabilities. In an example implementation, the ML capabilities of the UE indicated in the UECapabilityInformation message received from the UE may be used by gNB 204 to generate the ML configuration transmitted to the UE.

In some implementations, gNB 204, the gNB may process the received ML data and perform one or more actions. In some implementation, gNB 204 may forward the received ML data to another entity, e.g., core network entity, for further processing.

Additional example implementations are described herein.

Example 19. A method of communications, comprising: transmitting, by a network node, machine learning (ML) configuration to a user equipment (UE); and receiving, by the network node, machine learning (ML) data from the user equipment (UE), the machine learning (ML) data received in response to the machine learning (ML) configuration transmitted to the user equipment (UE).

Example 20. The method of Example 19, further comprising: transmitting, by the network node, a UECapabilityEnquiry message to the user equipment (UE); and receiving, by the network node, an UECapabilityInformation message from the user equipment (UE), the UECapabilityInformation message is received by the network node in response to the transmitting of the UECapabilityEnquiry message to the user equipment (UE), wherein the UECapabilityInformation message indicates machine learning capabilities of the user equipment (UE).

Example 21. The method of any combination of Examples 19-20, further comprising: generating the machine learning (ML) configuration based at least on the machine learning capabilities of the user equipment (UE) indicated by the user equipment (UE) in the UECapabilityInformation message.

Example 22. The method of any combination of Examples 19-21, further comprising: performing one or more actions based on at least on machine learning (ML) data received from the user equipment (UE).

Example 23. The method of any combination of Examples 19-22, wherein machine learning (ML) configuration is generated in response to a trigger to initiate machine learning (ML) procedures at the network node and/or the user equipment (UE).

Example 24. The method of any combination of Examples 19-23, wherein machine learning (ML) configuration includes a machine learning (ML) command that indicates to the user equipment (UE) the machine learning (ML) data to be collected at the user equipment (UE).

Example 25. The method of any combination of Examples 19-24, wherein the network node is a gNB.

Example 26. An apparatus comprising at least one processor and at least one memory including computer instructions, when executed by the at least one processor, cause the apparatus to perform a method of any of Examples 19-25.

Example 27. An apparatus comprising means for performing a method of any of Examples 19-25.

Example 28. A non-transitory computer-readable storage medium having stored thereon computer executable program code which, when executed on a computer system, causes the computer system to perform the steps of any of Examples 19-25.

Figure 8:
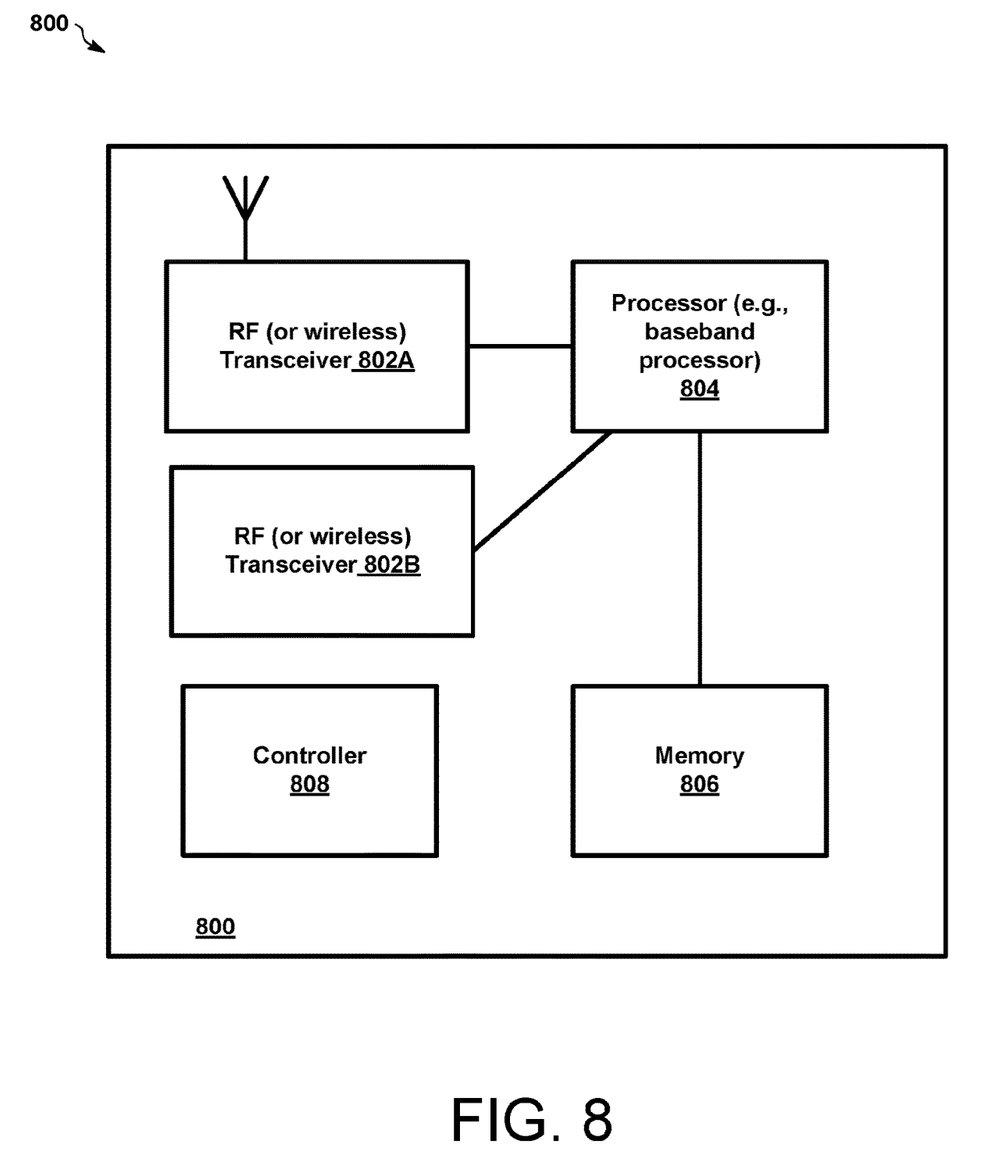
FIG. 8 is a block diagram of a node or wireless station (e.g., base station/access point or mobile station/user device/UE), according to an example implementation.

FIG. 8 is a block diagram 800 of a wireless station (e.g., user equipment (UE)/user device or AP/gNB/MgNB/SgNB) according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/808 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. In one example implementation, the smaller station may be a small cell operating at a lower power or at a higher frequency (e.g., above 6GHz). In another example implementation, the smaller station may be a small cell that may be used as a secondary cell (SCell) for a UE (instead of a primary cell (PCell) or mobility anchor).

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A user equipment apparatus (UE) comprising:
   at least one processor; and
   at least one memory including instructions, when executed by the at least one processor, cause the UE to:
     receive a machine learning (ML) configuration from a network node, the machine learning (ML) configuration causing the UE to collect data in a structure being used for machine learning (ML) at the network node, wherein the network node is a gNB, wherein the machine learning (ML) configuration includes a listing of cells the UE may use for configuring as secondary cells for dual connectivity and/or carrier aggregation;

collect machine learning (ML) data based at least on the machine learning (ML) configuration received from the network node, the machine learning (ML) data being collected from a packet data convergence protocol (PDCP) layer a radio link control (RLC) layer, a media access control (MAC) layer, and a physical (PHY) layer of the UE in a coordinated manner, wherein the machine learning (ML) data includes an error metric from all of the PDCP, the RLC, the MAC, and the PHY layers of the UE;

coordinate the collecting of the machine learning (ML) data at the UE, the collecting based at least on a machine learning (ML) command in the machine learning (ML) configuration, wherein the machine learning (ML) configuration includes a machine learning (ML) command that indicates the machine learning (ML) data to be collected in the coordinated manner at the user equipment (UE), and
wherein the UE coordinates the collection of machine learning (ML) data from all of the PDCP, the RLC, the MAC, and the PHY layers at the UE via direct interfaces from the RRC layer to the PDCP, the RLC, the MAC, and the PHY layers, wherein the UE coordinates machine learning (ML) data collection based at least on the machine learning (ML) command in the machine learning (ML) configuration;

receive a UECapabilityEnquiry message from the network node;

transmit a UECapability Information message to the network node, the UECapability Information message is transmitted to the network node in response to the receiving of the UECapabilityEnquiry message from the network node, wherein the machine learning (ML) configuration is received from the network node based at least on machine learning (ML) capabilities of the UE indicated to the network node in the UECapability Information message;

cause the network node to determine if raw machine learning (ML) data or averaged machine learning (ML) data is required based on the machine learning (ML) configuration;

transmit the collected machine learning (ML) data to the network node; and cause the network node to perform an action based on the transmitted machine learning (ML) data, wherein the action includes changing values of parameters at the UE for network optimization.

* * * * *